US009123919B2

United States Patent
Yun (10) Patent No.: US 9,123,919 B2
(45) Date of Patent: Sep. 1, 2015

(54) RECHARGEABLE BATTERY AND HEAT TREATMENT DEVICE

(71) Applicant: Samsung SDI Co., Ltd., Yongin, Gyeonggi-do (KR)

(72) Inventor: Ji-Won Yun, Yongin (KR)

(73) Assignee: Samsung SDI Co., Ltd., Yongin (KR)

( * ) Notice: Subject to any disclaimer, the term of this patent is extended or adjusted under 35 U.S.C. 154(b) by 239 days.

(21) Appl. No.: 13/802,054

(22) Filed: Mar. 13, 2013

(65) Prior Publication Data

US 2014/0065473 A1 Mar. 6, 2014

(30) Foreign Application Priority Data

Sep. 6, 2012 (KR) .................. 10-2012-0098820

(51) Int. Cl.
```
H01M 2/00      (2006.01)
H01M 2/02      (2006.01)
C21D 1/00      (2006.01)
H01M 10/39     (2006.01)
C21D 9/00      (2006.01)
H01M 10/60     (2014.01)
C21D 1/18      (2006.01)
H01M 10/615    (2014.01)
H01M 10/613    (2014.01)
```
(52) U.S. Cl.
CPC ............. H01M 2/0217 (2013.01); C21D 1/00 (2013.01); C21D 9/0068 (2013.01); H01M 10/3972 (2013.01); H01M 10/60 (2015.04); C21D 1/18 (2013.01); H01M 10/613 (2015.04); H01M 10/615 (2015.04)

(58) Field of Classification Search
CPC ............ H01M 10/50; H01M 10/5004; H01M 10/5006; H01M 2/0217; H01M 2/1247
USPC ............................ 429/62, 66, 121, 163, 176
See application file for complete search history.

(56) References Cited

U.S. PATENT DOCUMENTS 7,470,487 B2 12/2008 Tomimoto et al.

FOREIGN PATENT DOCUMENTS

| JP | 2003-151508 | | 5/2003 | |
| JP | 2005-044691 | * | 2/2005 | ............ H01M 10/04 |
| JP | 2005-44691 A | | 2/2005 | |

* cited by examiner

*Primary Examiner* — Patrick Ryan
*Assistant Examiner* — Ben Lewis
(74) *Attorney, Agent, or Firm* — Knobbe Martens Olson & Bear LLP (57) ABSTRACT

An embodiment of the present invention provides a rechargeable battery that prevents generation of a crack under the longitudinal compression condition by increasing an elongation ratio to a part of the bottom of the case to prevent an internal short-circuit. A rechargeable battery according to an exemplary embodiment of the present invention includes: a case receiving an electrode assembly; a cap plate covering an opening of the case; and an electrode terminal provided in the cap plate and electrically connected to the electrode assembly, the case includes side walls connected with each other and forming the opening in one side and a bottom connecting neighboring side walls at the opposite side of the opening for sealing, and the bottom a first elongation portion having a first elongation ratio and a second elongation portion having a second elongation ratio that is higher than the first elongation ratio.

16 Claims, 7 Drawing Sheets

RECHARGEABLE BATTERY AND HEAT TREATMENT DEVICE

CROSS-REFERENCE TO RELATED APPLICATIONS

This application claims priority to and the benefit of Korean Patent Application No. 10-2012-0098820 filed in the Korean Intellectual Property Office on Sep. 6, 2012, the entire contents of which are incorporated herein by reference.

BACKGROUND OF THE INVENTION

1. Field of the Invention

The described technology relates generally to a rechargeable battery where the case may be bent in a longitudinal compression condition.

2. Description of the Related Art

Unlike a primary battery, a rechargeable battery (i.e., a secondary battery) can be repeatedly recharged and discharged. Typical rechargeable batteries include a nickel-hydrogen battery, a lithium battery, a lithium ion battery, and the like. The rechargeable battery is manufactured in the form of a pack, and is commonly employed for mobile electronic devices such as cellular phones, notebook computers, and camcorders.

The rechargeable battery includes a jelly roll type of electrode assembly formed by winding a positive electrode and a negative electrode with a separator interposed therebetween in a stacked manner, a case receiving the electrode assembly along with electrolyte therein, and a cap assembly positioned on an upper opening of the case.

For example, the case is made of aluminum or an aluminum alloy, and has a cylindrical or angular shape. The case is compress-deformed due to pressure applied to a narrow side of the case in a perpendicular direction with respect to the up and down direction. That is, a lower wide side of the case is folded under in the longitudinal compression condition.

Under the longitudinal compression condition, a crack may be formed in the case when the side of the case is bent, and then the crack sequentially penetrates a negative electrode and a positive electrode of the electrode assembly, thereby causing a short-circuit between the negative electrode and the positive electrode in the electrode assembly. Due to such an internal short-circuit, the rechargeable battery may be ignited or exploded.

The above information disclosed in this Background section is only for enhancement of understanding of the background of the described technology and therefore it may contain information that does not form the prior art that is already known in this country to a person of ordinary skill in the art.

SUMMARY OF THE INVENTION

The described technology has been made in an effort to permit a case of a rechargeable battery to bend under a longitudinal compression condition.

An exemplary embodiment provides a rechargeable battery that can prevent or inhibit generation of a crack under the longitudinal compression condition by increasing an elongation ratio to a part of the bottom of the case to thereby prevent or inhibit an internal short-circuit due to the crack.

Another exemplary embodiment provides a heat treatment device that manufactures such a case of the rechargeable battery.

A rechargeable battery according to an exemplary embodiment includes: a case receiving an electrode assembly; a cap plate covering an opening of the case; and an electrode terminal provided in a terminal hole of the cap plate and electrically connected to the electrode assembly, the case includes side walls being connected with each other and forming the opening in one side and a bottom connecting neighboring side walls at the opposite side of the opening for sealing, and the bottom a first elongation portion having a first elongation ratio and a second elongation portion having a second elongation ratio that is higher than the first elongation ratio.

The first elongation portion may be set in both sides of a first direction in the bottom, and the second elongation portion may be disposed between the first elongation portions of the lateral sides of the bottom.

The second elongation portion may have a range set to the first direction from the center of the first direction.

A range of the second elongation portion in the first direction of the bottom may be set within a range that is greater than 0 and less than 30% with respect to the entire length of the first direction.

The second elongation portion may be formed throughout the entire range of the bottom along a second direction that crosses the first direction.

The bottom and the side wall may be connected through a curved corner, and the case may further include a third elongation portion having a second elongation ratio and formed in the corner.

The third elongation ratio may be formed with respect to the entire curved range along a curvature radius in the corner.

The first elongation portion may have hardness of 80 to 85 HV, and the second elongation portion may have hardness of 65 to 75 HV.

The second elongation portion may be formed in the shape of a line along a second direction that crosses the first direction in the center of the first direction.

The second elongation portion may be formed throughout the entire range of the bottom along the second direction.

The case may further include a third elongation portion continued from the second elongation portion with a second elongation ratio and extended to the side wall.

A heat treatment device according to another exemplary embodiment is provided in a case that includes a side wall forming an opening to receive an electrode assembly of a rechargeable battery and a bottom sealing the opposite side of the opening. The heat treatment device includes a cooling portion maintaining a first elongation ratio by partially cooling first portions formed at both sides of a first length direction of the bottom and a heating portion provided between the cooling portions in the first length direction to apply a second elongation ratio that is higher than the first elongation ratio by partially heating a second portion set between the first portions.

The heating portion may have a range set to the first direction from the center of the first direction.

The heating portion may be formed throughout the entire range of the bottom in a second direction that crosses the first direction.

The cooling portion may be formed throughout the entire range of the bottom in the second direction that crosses the first direction.

The bottom and the side wall may be connected through a curved corner, and the heat treatment device may further include an auxiliary heating portion applying the second elongation ratio to the corner.

The cooling portion may further include an auxiliary cooling portion applying the second elongation ratio to the corner.

As described, according to the embodiments, the bottom is partitioned into a first elongation portion and a second elongation portion and thus bending of a case can be introduced in a portion (e.g., the second elongation portion) having a relatively high elongation ratio.

As an elongation ratio is increased in a part of the bottom, a portion (i.e., the second elongation portion) having a high elongation ratio can be easily bent under a longitudinal compression condition. Thus, when the bending occurs, cracks are not formed in the bottom and the case due to the high elongation ratio. Accordingly, an internal short-circuit due to the crack does not occur.

DETAILED DESCRIPTION OF THE PREFERRED EMBODIMENT

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
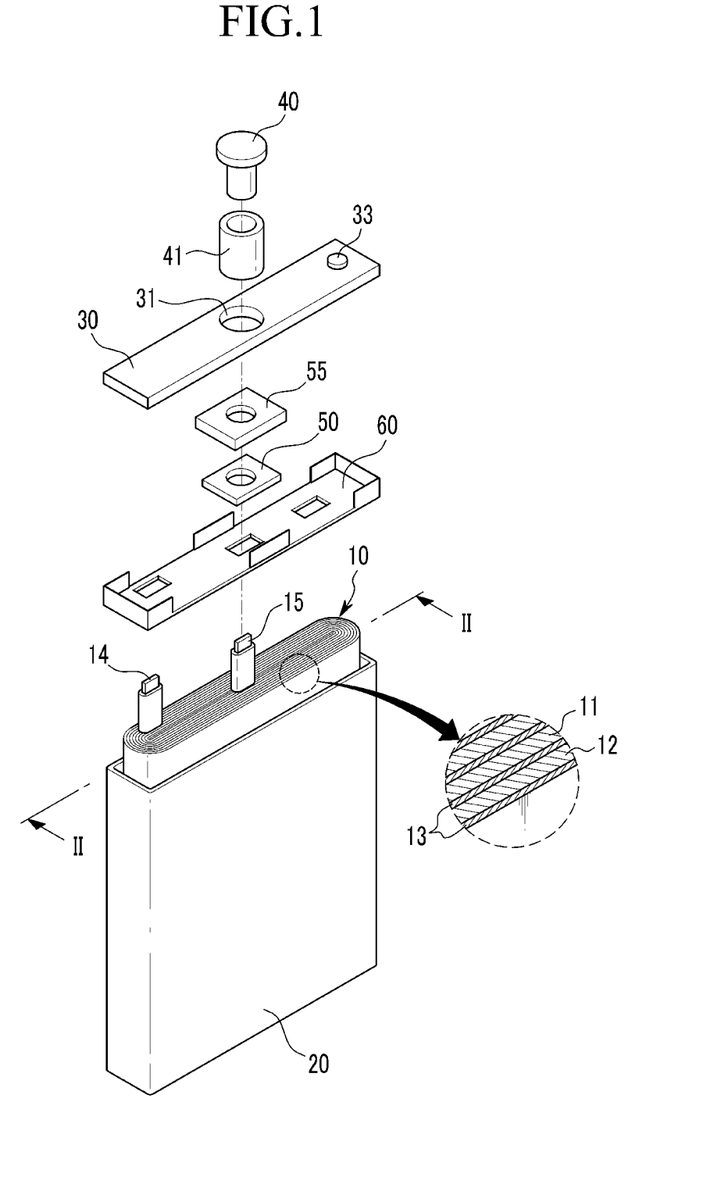
FIG. 1 is an exploded perspective view of a rechargeable battery according to a first exemplary embodiment of the present invention.
Figure 2:
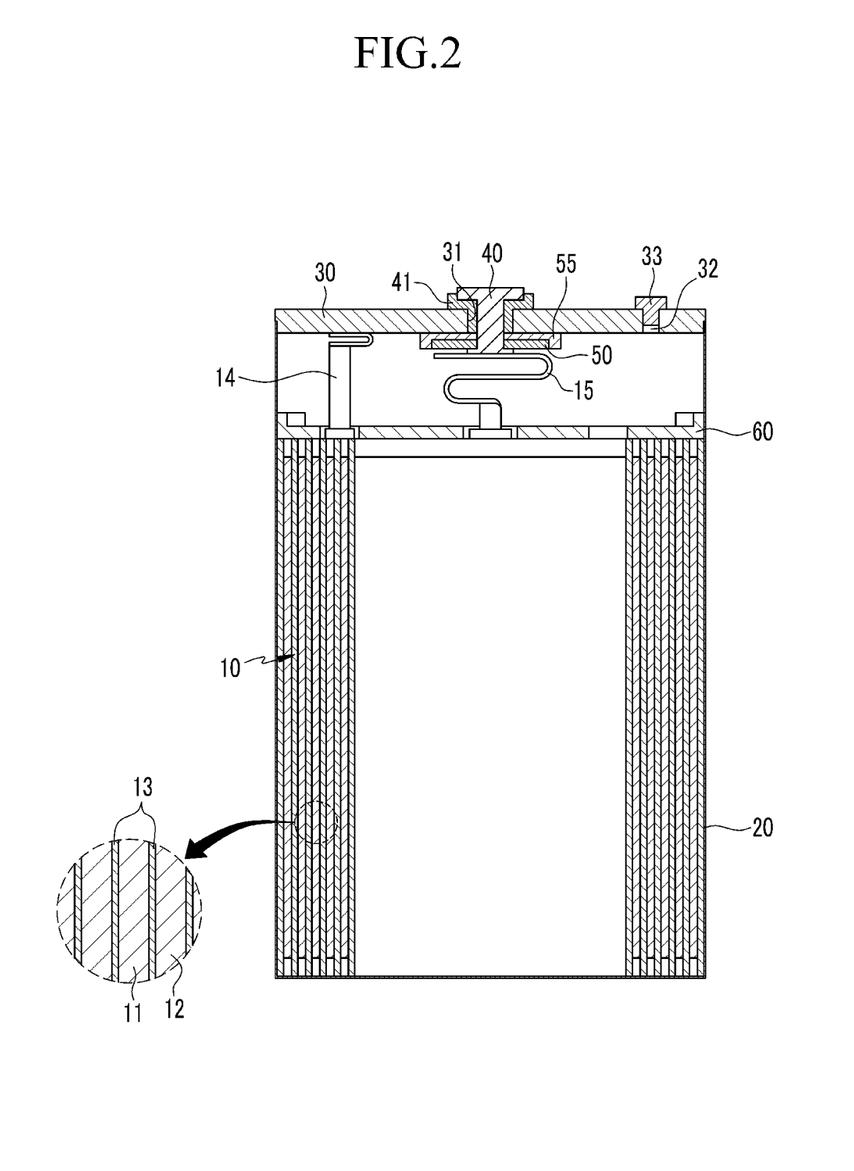
FIG. 2 is a cross-sectional view of FIG. 1, taken along the line II-II.

FIG. 1 is an exploded perspective view of a rechargeable battery according to a first exemplary embodiment of the present invention and FIG. 2 is a cross-sectional view of FIG. 1, taken along the line II-II.

Referring to FIG. 1 and FIG. 2, a rechargeable battery according to the first exemplary embodiment includes an electrode assembly 10 charging and discharging a current, a case 20 receiving the electrode assembly 10 together with an electrolyte solution, a cap plate 30 sealing an upper opening of the case 20 and an electrode terminal 40 provided in a terminal hole 31 of the cap plate 30 and thus electrically connected to the electrode assembly 10.

In addition, the rechargeable battery according to the first exemplary embodiment may further include a terminal plate 50 electrically connecting the electrode terminal 40 to the electrode assembly 10 and an insulation case 60 electrically insulating the electrode assembly 10 and the cap plate 30.

The electrode assembly 10 is formed a shape that corresponds to an inner space of the prismatic case 20 so as to be inserted into the case 20. The case 20 receives the electrode assembly 10 through the opening, and forms as a conductor to function as an electrode terminal. For example, the case 20 may be made of aluminum or an aluminum alloy.

The electrode assembly 10 is formed by stacking a positive electrode 11 and a negative electrode 12 at both surfaces with a separator 13, which is an electric insulating material interposed therebetween and by spiral-winding them in a jelly roll form. The electrode assembly 10 includes a positive electrode lead 14 that is connected to the positive electrode 11 and a negative electrode lead 15 that is connected to the negative electrode 12.

The positive electrode lead 14 is connected by welding to a lower surface of the cap plate 30, and the case 20 is electrically connected to the positive electrode 11 of the electrode assembly 10 through the cap plate 30 to operate as a positive terminal.

The negative electrode lead 15 is connected by welding to a lower surface of the terminal plate 50 that is connected to one end of the electrode terminal 40, and the electrode terminal 40 that is provided in the terminal hole 31 of the cap plate 30 is electrically connected to the negative electrode 12 of the electrode assembly 10 to operate as a negative terminal.

As the positive electrode lead is connected to the cap plate, the case may operate as a positive terminal, and as the negative electrode lead is connected to the electrode terminal, the electrode terminal may operate as the negative electrode lead (not shown).

The electrode terminal 40 is inserted into the terminal hole 31 of the cap plate 30 with an insulation gasket 41 interposed therebetween. That is, the insulation gasket 41 electrically insulates the terminal hole 31 and the electrode terminal 40 and forms a sealing structure between the terminal hole 31 and the electrode terminal 40.

The terminal plate 50 is electrically connected to the electrode terminal 40 with the insulation plate 55 interposed therebetween. That is, the insulation plate 55 electrically insulates the cap plate 30 and the terminal plate 50 and forms a sealing structure between the cap plate 30 and the terminal plate 50.

The insulation case 60 is installed between the electrode assembly 10 and the terminal plate 50 and electrically insulates the positive electrode 11 of the electrode assembly 10 and the terminal plate 50 representing a negative electrode property.

The cap plate 30 includes an electrolyte injection opening 32. The electrolyte injection opening 32 couples the cap plate 30 to the case 20 and enables to inject an electrolyte solution into the case 20. After the electrolyte solution is injected, the electrolyte injection opening 32 is sealed by the sealing cap 33.

Figure 3:
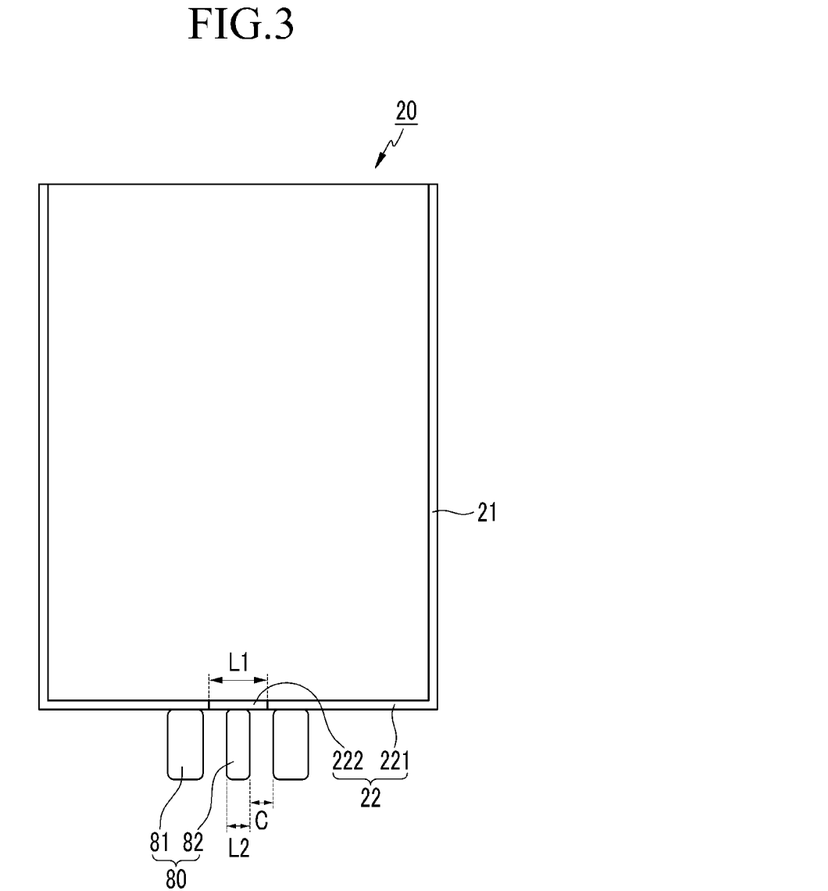
FIG. 3 shows heat treatment performed on a case using a heat treatment device according to a first exemplary embodiment of the present invention.

FIG. 3 shows heat treatment performed on the case 20 using a heat treatment device 80 according to the first exemplary embodiment of the present invention. Referring to FIG. 1 and FIG. 3, the case 20 includes a side wall 21 forming an opening in one side and a bottom 22 formed in the opposite side of the opening. The side walls 21 are connected with each other along the circumference thereof, and the bottom 22 seals the opposite side of the opening by connecting the neighboring side wall 21.

Figure 4:
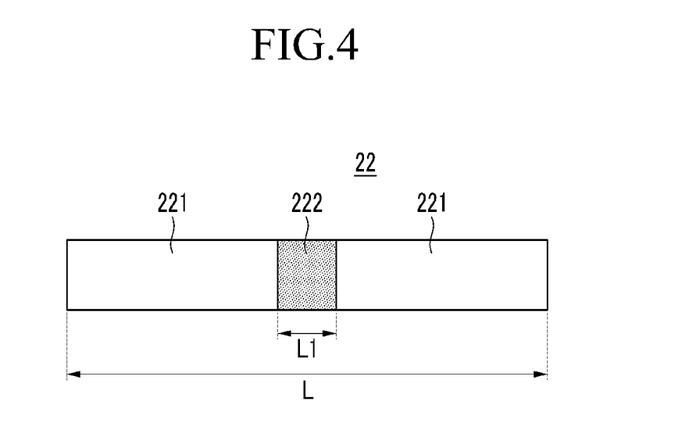
FIG. 4 shows a bottom of the case that has experienced the heat treatment in FIG. 3.

FIG. 4 shows the bottom 22 of the case heat-treated in FIG. 3. Referring to FIG. 3 and FIG. 4, the bottom 22 includes a first elongation portion 221 having a first elongation ratio and a second elongation portion 222 having a second elongation ratio that is higher than the first elongation ratio.

High elongation indicates low hardness. Thus, the first elongation portion 221 and the second elongation portion 222 can be determined according to hardness. For example, the first elongation portion 221 has hardness of 80 to 85 HV, and the second elongation portion 222 has hardness of 65 to 75 HV.

The first elongation portion 221 comprises two portions that extend from a left and right direction in FIG. 3 and FIG. 4. The second elongation portion 222 is set between the lateral first elongation portions 221 in the bottom 22.

The first elongation portion 221 is not heat-treated in the bottom 22 and the second elongation portion 22 is in the annealing state. That is, since the second elongation portion 222 is heated and then slowly cooled depending on a material of the case 20, influences due to heat history and processing remaining in an internal structure of the material are eliminated.

Figure 5:
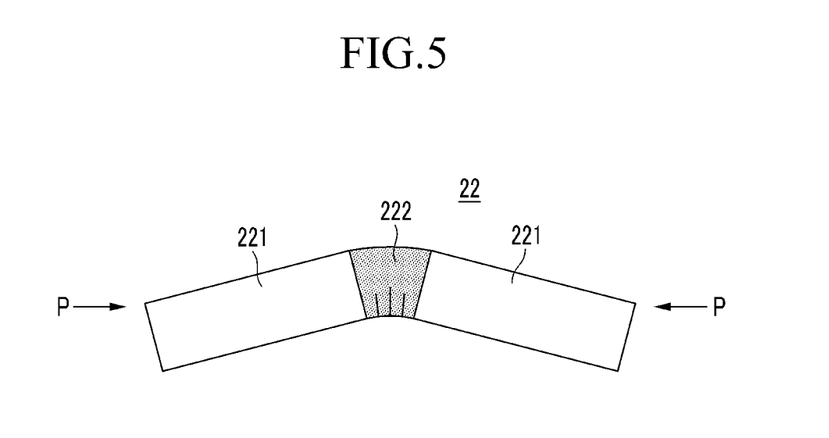
FIG. 5 shows the bottom of the case, bent under a longitudinal compression condition.

FIG. 5 shows a bent state of the bottom 22 of the case under the longitudinal compression condition. Referring to FIG. 4 and FIG. 5, the second elongation portion 222 has a range L1 set along the first direction from the center (i.e., the left and right direction of FIG. 4) of the first direction.

In this case, the range L1 of the second elongation portion 222 is set to be greater than 0 and less than 30% with respect to the entire length L of the bottom 22 in the first direction (Here, L1=L*30%). Under a longitudinal compression condition in which a load P is applied to the side wall 21 having a narrow area, the second elongation portion 222 prevents a crack from being formed while introducing bending of the case 20 within the range L1.

On the other hand, when the second elongation portion 222 is not included, a crack is formed during bending so that an internal short-circuit may occur as in a conventional art. When the length L1 of the second elongation portion 222 exceeds 30% of the entire length L, the range of the second elongation portion 222 becomes excessively wide in the entire bottom 22 so that bending in a specific location cannot be easily introduced.

That is, the second elongation portion 222 has low hardness compared to hardness of the first elongation portion 221 and thus introduces bending of the bottom 22, and the second elongation portion 222 has a higher elongation ratio compared to an elongation ratio of the first elongation portion 221 and thus prevents occurrence of cracks during bending of the bottom 22.

In addition, the second elongation portion 222 is formed over the entire range of the bottom 22 along a second direction (up and down direction of FIG. 4) that crosses the first direction. That is, the second elongation portion 22 is formed over the entire width direction of the bottom 22.

Thus, under the longitudinal compression condition, the second elongation portion 222 having a relative higher elongation ratio compared to that of the first elongation portion 221 prevents cracks from being formed while introducing bending of the bottom 22 in the entire width direction. That is, an internal short-circuit of the electrode assembly 10 can be prevented in the longitudinal compression condition.

Referring back to FIG. 3, the heat treatment device 80 according to the first exemplary embodiment has a structure corresponding to the first and second elongation portions 221 and 222 to partially cool and heat the bottom 22 of the case 20.

That is, the heat treatment device 80 of the first exemplary embodiment includes a cooling portion 81 and a heating portion 82 formed corresponding to the first and second elongation portions 221 and 222. For one example, the cooling portion 81 may have a structure including a water jacket that circulates cooling water, and the heating portion 82 may have a structure that includes a heater (not shown).

The cooling portion 81 is formed corresponding to the first elongation portion 221 and cools the first elongation portion 221 by being closely attached thereto to maintain the first elongation portion 221 with the first elongation ratio.

The cooling portion 81 prevents or inhibits transmission of heat heated by the heating portion 82 to the first elongation portion 221 from the second elongation portion 222. That is, the cooling portion 81 prevents unnecessary heat treatment of the first elongation portion 221 by the heating portion 82.

The heating portion 82 is provided between the cooling portions 81, and applies the second elongation ratio to the second elongation portion 222 by heating the second elongation portion 222 and the slowly cooling the same. The heating portion 82 intensely heats and then cools a portion to be bent in the bottom 22 such that the second elongation portion 222 can be formed between the first elongation portions 221.

The heating portion 82 may have a range L2 set in the first direction from the center (the left and right direction in FIG. 3) corresponding to the range L1 of the second elongation portion 222. The range L2 of the heating portion 82 and a gap C between the heating portion 82 and the cooling portion 81 may determine the range L1 of the second elongation portion 222.

Hereinafter, other exemplary embodiments of the present invention will be described. In a description of the following exemplary embodiment, constituent elements identical to or corresponding to those of the first exemplary embodiment will be omitted, and dissimilar constituent elements will be compared and described.

Figure 6:
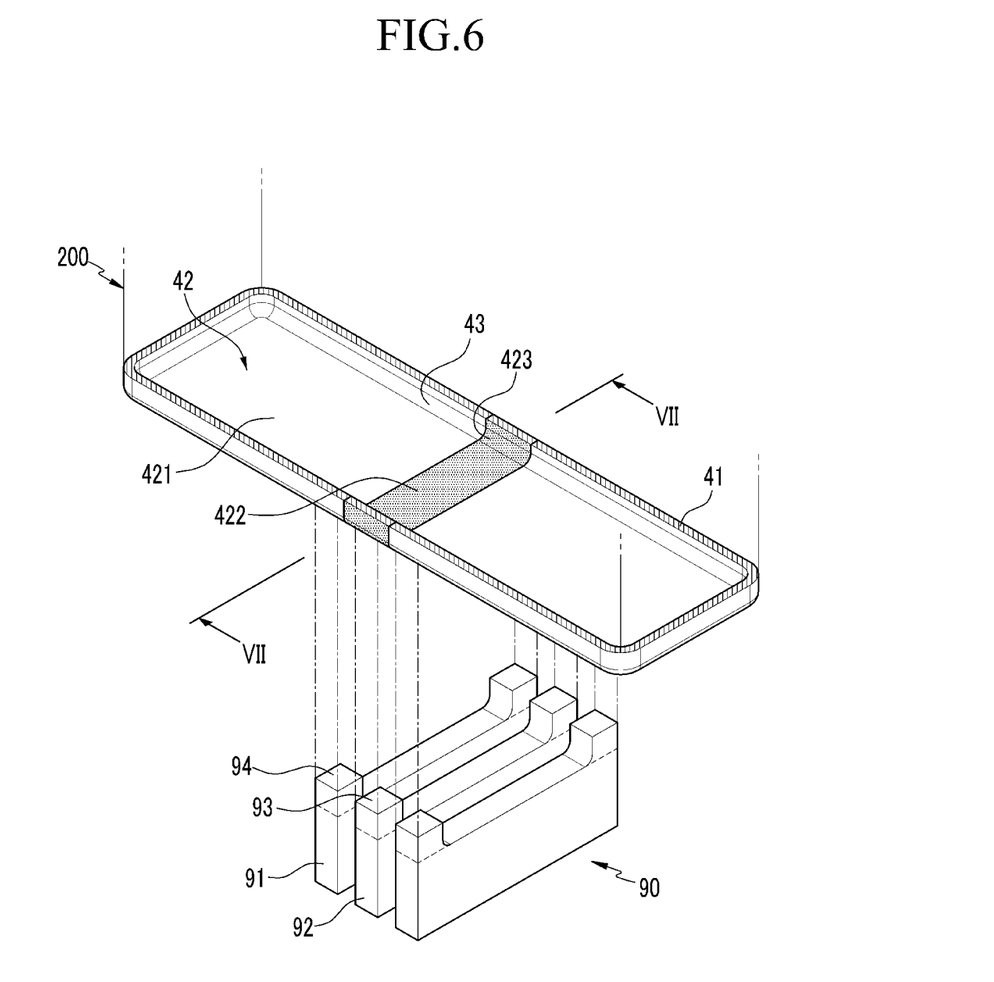
FIG. 6 is an exploded perspective view of heat treatment performed on a case of a rechargeable battery according to a second exemplary embodiment of the present invention using a heat treatment device according to the second exemplary embodiment of the present invention.
Figure 7:
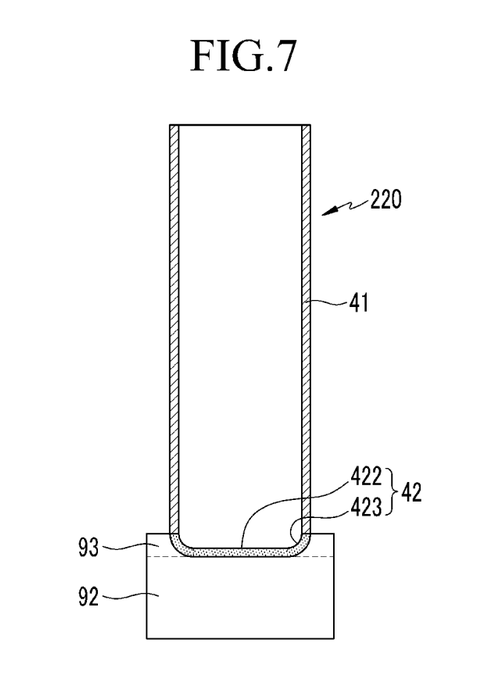
FIG. 7 is a cross-sectional view of FIG. 6, taken along the line VII-VII.

FIG. 6 is an explode perspective view of a heat treatment device 90 performing heat treatment on a case 220 of a rechargeable battery according to a second exemplary embodiment of the present invention, and FIG. 7 is a partial cross-sectional view of the case 220, heat-treated in FIG. 6.

Figure 8:
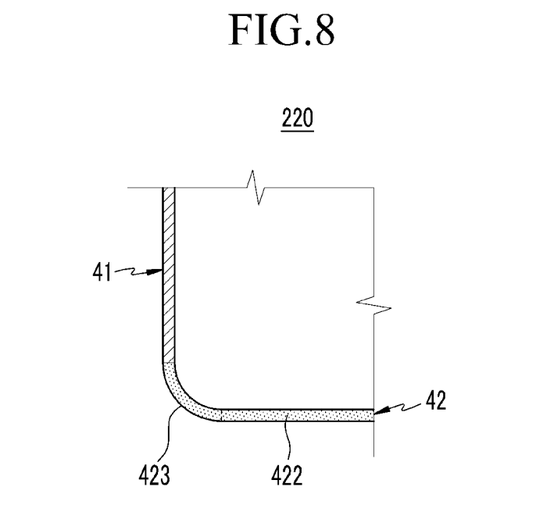
FIG. 8 is a partial cross-sectional view of the case that has experienced heat treatment in FIG. 6.

In the case 220 of the second exemplary embodiment, the bottom 42 and the side wall 41 are connected through a curved corner 43, and the case 220 further includes a third elongation portion 423 in the corner 43. The third elongation portion 423 may be formed throughout the entire curved range along a curvature radius in the corner 43.

That is, the bottom 42 is provided with a first elongation portion 421 and a second elongation portion 422. The first elongation portion 421 is connected with the corner 43 with the same first elongation ratio. However, the third elongation portion 423 is connected with the corner 43 in the second elongation portion 422 with a second elongation ratio.

That is, the second elongation portion 422 has lower hardness and higher elongation ratio in the bottom 42 compared to the first elongation portion 421. The third elongation portion 423 decreases hardness and increases an elongation ratio in the corner 43 compared to the first elongation portion 421. Thus, the third elongation portion 423 can introduce stable bending in the corner 43 where resistance with respect to the bending can be strong under a longitudinal compression condition.

The heat treatment device 90 according to the second exemplary embodiment includes cooling portions 91 and a heating portion 92 formed corresponding to the first elongation portion 421 and the second elongation portion 422.

The heat treatment device 90 includes an auxiliary heating portion 93 forming the third elongation portion 423 by applying a second elongation ratio to the curved corner 43 and an auxiliary cooling portion 94 applying a first elongation ratio to both sides of the third elongation portion 423 of the corner 43.

The cooling portions 91 are formed corresponding to the first elongation portion 421 of the bottom 42, and maintain the first elongation portion 421 with the first elongation portion by being closely attached to the first elongation portion 421 and cooling the same.

The heating portion 92 is provided between the cooling portions 91 to apply the second elongation ratio to the second elongation portion 422 by heating the second elongation portion 422 and then slowly cooling the same. The heating portion 92 can form the second elongation portion 422 by intensely heating a portion to be bent in the bottom 42.

The auxiliary heating portion 93 is formed corresponding to the corner 43 to maintain the third elongation portion 423 with the second elongation ratio by being closely attached to the third elongation portion 423 and heating the same. For example, the auxiliary heating portion 92 may be curved to receive the curved corner 43.

The auxiliary cooling portion 94 is formed corresponding to the corner 43, and maintains the third elongation portion 423 with the first elongation portion by being closely attached to both side corners 43 of the third elongation portion 423 and then cooling the corners 43. The auxiliary cooling portion 94 prevents or inhibits heat heated by the auxiliary heating portion 93 from being transmitted to the both side corners 43 of the third elongation portion 423. For example, the auxiliary cooling portion 94 may be curved to receive the curved corner 43.

Figure 9:
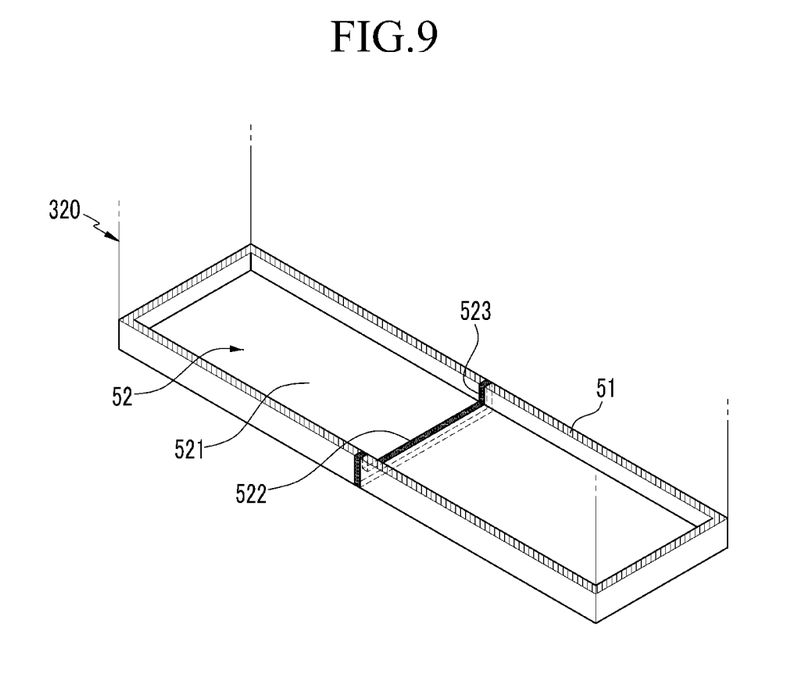
FIG. 9 is a partial perspective view of a case of a rechargeable battery according to a third exemplary embodiment of the present invention.
Figure 10:
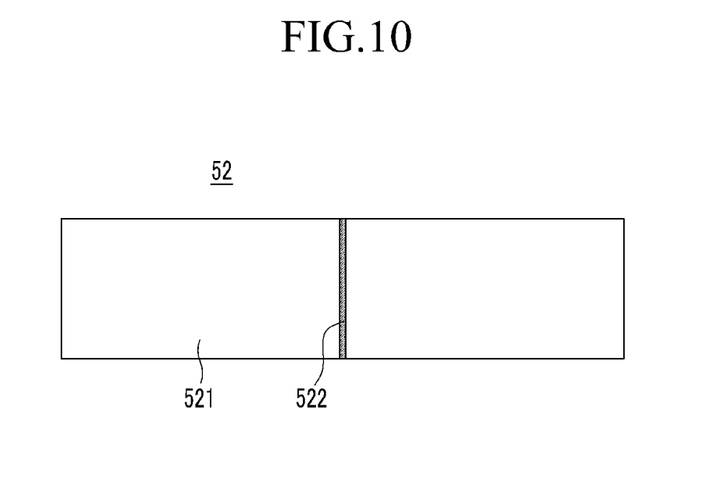
FIG. 10 shows a bottom of the heat-treated case.

FIG. 9 is a partial perspective view of a case of a rechargeable battery according to a third exemplary embodiment of the present invention and FIG. 10 is a view of a bottom of heat-treated case.

Referring to FIG. 9 and FIG. 10, in the third exemplary embodiment, a second elongation portion 522 formed between lateral sides of a first elongation portion 521 in a bottom 52 is formed in the shape of a line. In the first and second exemplary embodiments, the second elongation portions 222 and 422 have the set range L1.

Thus, under a longitudinal compression condition, the second elongation portion 522 of the third exemplary embodiment can introduce bending of the bottom 52 in a further precise location compared to the bending of the bottoms 22 and 42 introduced by the second elongation portions 222 and 422 of the first and second exemplary embodiments.

In this case, in the third exemplary embodiment, the second elongation portion 522 is formed throughout the entire range of the bottom 52 along a second direction (up and down direction of FIG. 10) so that uniform bending of the bottom 52 can be introduced along the second direction.

The case 320 further includes a third elongation portion 523 connected to the second elongation portion 522 and then extended to a side wall 51. The third elongation portion 523 connects the bottom 52 and the side wall 51.

That is, the second elongation portion 522 reduces hardness and increases an elongation ratio in the bottom 52 compared to the first elongation portion 521. The third elongation portion 523 reduces hardness and increases an elongation ratio in the side wall 51 compared to the first elongation portion 521.

In the case 320 of the third exemplary embodiment, the bottom 52 and the side wall 51 are perpendicularly connected, but may be connected through the curved corner (43, refer to FIG. 6) as in the second exemplary embodiment. In this case, the third elongation portion may be formed extended to the bottom, the corner, and the side wall (not shown).

Although it is not illustrated, a heat treatment device in the third exemplary embodiment includes a cooling portion and a heating portion formed corresponding to the first elongation portion 521 and the second elongation portion 522 of the bottom 52, and may further include an auxiliary heating portion applying a second elongation ratio and an auxiliary cooling portion applying a first elongation ratio to the side wall 51 (refer to FIG. 6).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
a case receiving an electrode assembly;
a cap plate covering an opening of the case; and
an electrode terminal provided in a terminal hole of the cap plate and electrically connected to the electrode assembly,
wherein the case comprises,
side walls being connected with each other and forming the opening in one side and
a bottom connecting neighboring side walls at the opposite side of the opening for sealing, and
the bottom comprises,
a first elongation portion having a first elongation ratio and
a second elongation portion having a second elongation ratio that is higher than the first elongation ratio wherein the first elongation portion is set in both sides of a first direction in the bottom, and the second elongation portion is disposed between the first elongation portions of the lateral sides of the bottom wherein the second elongate portion has a range set to the first direction from the center of the first direction and wherein the second elongate portion is formed though out the entire range of the bottom along a second direction that crosses the first direction.

2. The rechargeable battery of claim 1, wherein a range of the second elongation portion in the first direction of the bottom is set within a range that is greater than 0 and less than 30% with respect to the entire length of the first direction.

3. The rechargeable battery of claim 1, wherein the bottom and the side wall are connected through a curved corner, and the case further comprises a third elongation portion having a second elongation ratio and formed in the corner.

4. The rechargeable battery of claim 3, wherein the third elongation ratio is formed with respect to the entire curved range along a curvature radius in the corner.

5. The rechargeable battery of claim 1, wherein the first elongation portion has hardness of 80 to 85HV, and the second elongation portion has hardness of 65 to 75HV.

6. The rechargeable battery of claim 1, wherein the second elongation portion is formed in the shape of a line along a second direction that crosses the first direction in the center of the first direction.

7. The rechargeable battery of claim 6, wherein the second elongation portion is formed throughout the entire range of the bottom along the second direction.

8. The rechargeable battery of claim 7, wherein the case further comprises a third elongation portion continued from the second elongation portion with a second elongation ratio and extended to the side wall.

9. A heat treatment device for a case including a side wall forming an opening to receive an electrode assembly of a rechargeable battery and a bottom sealing the opposite side of the opening, the heat treatment device comprising:

a cooling portion maintaining a first elongation ratio by partially cooling first portions formed at both sides of a first length direction of the bottom and a heating portion provided between the cooling portions in the first length direction to apply a second elongation ratio that is higher than the first elongation ratio by partially heating a second portion set between the first portions.

10. The heat treatment device of claim 9, wherein the heating portion has a range set to the first direction from the center of the first direction.

11. The heat treatment device of claim 9, wherein the heating portion is formed throughout the entire range of the bottom in a second direction that crosses the first direction.

12. The heat treatment device of claim 11, wherein the cooling portion is formed throughout the entire range of the bottom in the second direction that crosses the first direction.

13. The heat treatment device of claim 9, wherein the bottom and the side wall are connected through a curved corner, and the heat treatment device further comprises an auxiliary heating portion applying the second elongation ratio to the corner.

14. The heat treatment device of claim 13, wherein the cooling portion further comprises an auxiliary cooling portion applying the second elongation ratio to the corner.

15. A battery case comprising:

a plurality of side walls and a bottom wall that are continuously attached to each other, wherein the plurality of side walls define an internal space that is sized to receive an electrode assembly and an opening that provides access to the internal space, wherein the opening is sized to receive a cap assembly;

wherein the bottom surface of the battery case includes a first portion that has a first bending parameter and two second portions located outward from the first portion that has a second bending parameter wherein the first portion bends at a lower application of force than the second portions wherein the first and second portions of the bottom surface extend into the side walls.

16. The battery case of claim 15, wherein the first and second bending parameters comprise elongation ratios and wherein the elongation ratio for the first portion is greater than the elongation ratio for the second portion.

* * * * *